US010842145B2

(12) United States Patent
Daly, Jr.

(10) Patent No.: US 10,842,145 B2
(45) Date of Patent: Nov. 24, 2020

(54) SELF-ARMING ELECTRONIC RODENT TRAP AND SYSTEM AND METHOD FOR USE THEREOF (71) Applicant: WOODSTREAM CORPORATION, Lititz, PA (US)

(72) Inventor: Thomas J. Daly, Jr., Lititz, PA (US)

(73) Assignee: Woodstream Corporation, Lancaster, PA (US)

( * ) Notice: Subject to any disclaimer, the term of this patent is extended or adjusted under 35 U.S.C. 154(b) by 226 days.

(21) Appl. No.: 15/906,691

(22) Filed: Feb. 27, 2018

(65) Prior Publication Data

US 2018/0249699 A1 Sep. 6, 2018

Related U.S. Application Data (60) Provisional application No. 62/466,114, filed on Mar. 2, 2017.

(51) Int. Cl.
*A01M 23/38* (2006.01)
*A01M 31/00* (2006.01)
*H04L 29/08* (2006.01)

(52) U.S. Cl.
CPC .......... *A01M 23/38* (2013.01); *A01M 31/002* (2013.01); *A01M 2200/00* (2013.01); *H04L 67/10* (2013.01)

(58) Field of Classification Search
CPC ...... A01M 23/00; A01M 23/38; A01M 23/14; A01M 2200/00; A01M 31/002
USPC ................................................. 43/58, 73, 98
See application file for complete search history.

(56) References Cited

U.S. PATENT DOCUMENTS

| 3,564,750 | A | * | 2/1971 | Burgess | A01M 1/026 43/107 |
| 4,949,500 | A | * | 8/1990 | Jefferys | A01M 1/2011 43/112 |
| 5,406,742 | A | * | 4/1995 | Allen | A01M 23/38 43/98 |
| 6,088,948 | A | | 7/2000 | Ronnau | |
| 6,735,899 | B1 | | 5/2004 | Anderson et al. | |
| 6,836,999 | B2 | | 1/2005 | Rich et al. | |
| 7,219,466 | B2 | | 5/2007 | Rich et al. | |
| 7,757,430 | B2 | | 7/2010 | Wetzel et al. | |
| 2009/0102600 | A1 | | 4/2009 | Noe et al. | |
| 2011/0119987 | A1 | * | 5/2011 | Alter | A01M 23/20 43/61 |

(Continued)

FOREIGN PATENT DOCUMENTS

WO  WO-9848620 A1 * 11/1998 ............. A01M 23/12
WO  WO-2015185063 A1 * 12/2015 ............. A01M 23/24

*Primary Examiner* — Lisa L Tsang
(74) *Attorney, Agent, or Firm* — Barley Snyder (57) ABSTRACT A rodent trap having a remote arming capability and a method of deploying a rodent trap in an unarmed state and then arming the trap after a wait period without the user having to again physically access the trap is provided. The trap, preferably embodied as an electronic rodent trap, may be configured with wireless remote arming capability, timed arming functionality, activity based arming and the like. When in the unarmed state, the trap operates in a monitoring mode in which the trap can monitor and evaluate activity and/or interactions with the trap and can send and receive wireless communication signals.

18 Claims, 5 Drawing Sheets (56) References Cited

U.S. PATENT DOCUMENTS

| | | | |
|---|---|---|---|
| 2013/0162443 A1* | 6/2013 | Oppenheimer | H04Q 9/00 340/870.03 |
| 2016/0029614 A1 | 2/2016 | Yamasaki | |
| 2016/0192635 A1 | 7/2016 | Rich et al. | |
| 2016/0338337 A1 | 11/2016 | Waldman et al. | |
| 2017/0035041 A1* | 2/2017 | Othon | A01M 25/004 |
| 2018/0167764 A1* | 6/2018 | Wu | A01M 23/00 |

* cited by examiner

SELF-ARMING ELECTRONIC RODENT TRAP AND SYSTEM AND METHOD FOR USE THEREOF

This application claims the priority of U.S. provisional application Ser. No. 62/466,114, filed Mar. 2, 2017.

BACKGROUND OF THE INVENTION

Field of the Invention

The present invention is related to the field of rodent control and, more particularly, to a device and method for acclimating rodents to the presence of traps by deploying the traps in an unarmed state, the traps being configured to operate in a monitoring mode and to self-arm at a later time without manual intervention by the user.

Description of the Related Art

Rodents, and rats in particular, are neophobic, meaning that they are skeptical of new objects in their environment. It is well documented that rodents will avoid a new object for a period of time which may be hours, days or even weeks, even if there is bait or food associated with the new object.

To deal with this neophobic tendency, one technique used by pest control professionals and other persons knowledgeable about trapping rodents is to introduce the rodent traps into an environment with bait but without being set. After a determined wait period has passed for the rodents to become acclimated to the traps, the pest control technician returns to the traps and sets them. This technique accomplishes at least two goals. First, the baited but innocuous state of the traps allows rodents to interact therewith for the wait period without being killed. Second, as rodents successfully feed at the traps without injury, they leave behind urine and scents/pheromones that are reassuring to other rodents, making them feel that the new object is safe to approach.

The drawback of the foregoing technique is the time and labor required to bait and place the traps without setting them, to thereafter leave the traps for the wait period, and to then return to actually set each of the traps at a later date.

Accordingly, a need exists for a device and method by which introduced rodent traps may be placed in a baited or unbaited configuration, but without being set, and then, after a waiting period, be non-manually activated or set, thereby eliminating the need for a technician to return to the traps a second time.

SUMMARY OF THE INVENTION

In view of the foregoing, the present invention is directed to a rodent trap having a non-manual or self-arming capability and a method of deploying a rodent trap in an unarmed state and then arming the trap after a wait period without the user having to physically access the trap. The traps, preferably embodied as electronic rodent traps, may be configured with wireless remote arming capability, timed arming functionality, activity based arming and the like.

Accordingly, it is an object of the present invention to provide an electronic rodent trap that can be baited and placed in an unarmed configuration in which the trap is not set and then, after a determined wait period, can be remotely armed by a wireless communication signal or can arm itself to a kill configuration without the need for the user to physically access the trap.

Another object of the present invention is to provide an electronic rodent trap in accordance with the preceding object in which the trap is set or armed to the kill configuration using a remote controller or a smartphone, web or PC application.

A further object of the present invention is to provide an electronic rodent trap in accordance with the initial object in which the trap is set or armed to the kill configuration at a specified time or after a specified time period has elapsed using a timer-based aiming mechanism such as a firmware-based timer, a mechanical timer, a cloud-based timer and the like.

Yet another object of the present invention is to provide an electronic rodent trap in accordance with the initial object in which the trap when unarmed operates in a waiting or monitoring mode in which the trap monitors interactions with the trap but is not automatically activated thereby, the trap in monitoring mode being configured to set or arm itself to the kill configuration in response to a specified criteria, such as upon detecting a threshold level of rodent activity in or proximal to the trap.

Still another object of the present invention is to provide an electronic rodent trap in accordance with the preceding object in which the trap includes at least one sensor that detects proximal activity or interactions with the trap based on the sensing of one or more parameters including, but not limited to, motion, temperature, impedance, infrared and proximity, the trap when in monitoring mode keeping track of the proximal activity or interactions.

A further object of the present invention is to provide an electronic rodent trap in accordance with the preceding two objects in which a trap controller or central processing unit receives data from at least one sensor on an ongoing basis and evaluates the data to determine whether the sensed activity likely represents rodent or non-rodent activity.

A still further object of the present invention is to provide an electronic rodent trap in accordance with the preceding three objects in which the user can set a threshold number of rodent interactions to be detected before the trap will arm itself to the kill configuration.

Another object of the present invention is to provide an electronic rodent trap in accordance with the preceding four objects in which the user has the option, when the trap is in monitoring mode, of being notified of trap interactions considered to be rodent related upon the occurrence of each or a selected number of interactions and can choose to remotely arm the trap before the threshold number of interactions has been reached.

Yet another object of the present invention is to provide an electronic rodent trap in accordance with the preceding objects that can be placed and left in an unarmed state and then armed at a later time with the user only needing a single physical interaction with the trap, thus reducing time and labor requirements associated with trap deployment and operation.

Still another object of the present invention is to provide a self-arming electronic rodent trap that includes a high voltage output circuit coupled to a plurality of killing plates and a central processing unit for controlling the high voltage output circuit, the central processing unit being configured to change a state of the trap from an unarmed state to an armed state in response to an arming event that occurs at a time subsequent to trap deployment, the change of state being effected without manual intervention by a user.

A further object of the present invention is to provide a self-arming electronic rodent trap in accordance with the preceding object in which the trap further includes a timer, the arming event including expiration of a time period set by the timer.

A still further object of the present invention is to provide a self-arming electronic rodent trap in accordance with the preceding two objects in which the trap further includes an activity sensor, the trap in the unarmed state using the activity sensor to monitor activity in or adjacent to the trap while the high voltage circuit remains inactive, the arming event including detection of a threshold level of rodent activity in or adjacent to the trap by the activity sensor.

Yet a further object of the present invention is to provide a self-arming electronic rodent trap in accordance with the preceding three objects in which the trap further includes a communications chip that enables the central processing unit to be in wireless communication with a remote user, the arming event including receipt of a wireless signal from the remote user instructing the central processing unit to activate the trap to the armed state.

Another object of the present invention is to provide a self-arming electronic rodent trap system that includes an electronic rodent trap and a remote device for wirelessly communicating with the trap, the trap having a high voltage output circuit coupled to a plurality of killing plates, a central processing unit for controlling the high voltage output circuit, and a communications chip, the central processing unit being configured to change a state of the trap from an unarmed state to an armed state in response to an arming event that occurs at a time subsequent to trap deployment, the change of state being effected in an absence of manual intervention by a user, and the device enabling a remote user to wirelessly communicate with the trap central processing unit through the communications chip.

Still another object of the present invention is to provide a method of operating an electronic rodent trap to enable rodents to become acclimated to the trap that includes placing an electronic rodent trap in a desired location in an unarmed state, the electronic rodent trap having a high voltage output circuit coupled to a plurality of killing plates, and a central processing unit for controlling the high voltage output circuit, the trap in the unarmed state operating in the desired location in a monitoring mode that does not result in activation of the high voltage circuit upon rodent interaction with the trap, the trap remaining in monitoring mode until an arming event occurs and the central processing unit, in response to the arming event, changing a state of the trap to an armed state, the change of state being effected by the central processing unit without manual intervention by a user.

Yet another object of the present invention is to provide a method of operating an electronic rodent trap to enable rodents to become acclimated to the trap in accordance with the preceding object that includes, as part of the step of placing the electronic rodent trap, the step of setting an internal timer in the trap for a time period, or of the user setting a cloud-based timer for a time period, the trap operating in the monitoring mode until the time period expires and expiration of the time period serving as the arming event.

A further object of the present invention is to provide a method of operating an electronic rodent trap to enable rodents to become acclimated to the trap in accordance with the preceding two objects in which the trap, either with or without a timer, includes an activity sensor, the step of operating in the desired location in the monitoring mode including the trap monitoring activity proximal to and/or interactions with the trap using the activity sensor and trap remaining in the monitoring mode until a threshold number of interactions have been sensed, sensing of the threshold number of interactions serving as the arming event.

A still further object of the present invention is to provide a method of operating an electronic rodent trap to enable rodents to become acclimated to the trap in accordance with the preceding three objects in which the trap is able to receive a wireless activation signal sent from a remote user instructing the central processing unit of the trap to arm the trap.

Yet a further object of the present invention is to provide a method of operating an electronic rodent trap to enable rodents to become acclimated to the trap in accordance with the preceding object in which the wireless activation signal is sent from a remote user using a device selected from the group consisting a dedicated remote controller, a smartphone app, a computing device with an internet connection, and a computing device using cloud communication.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

It is to be understood that the embodiments described herein are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1:
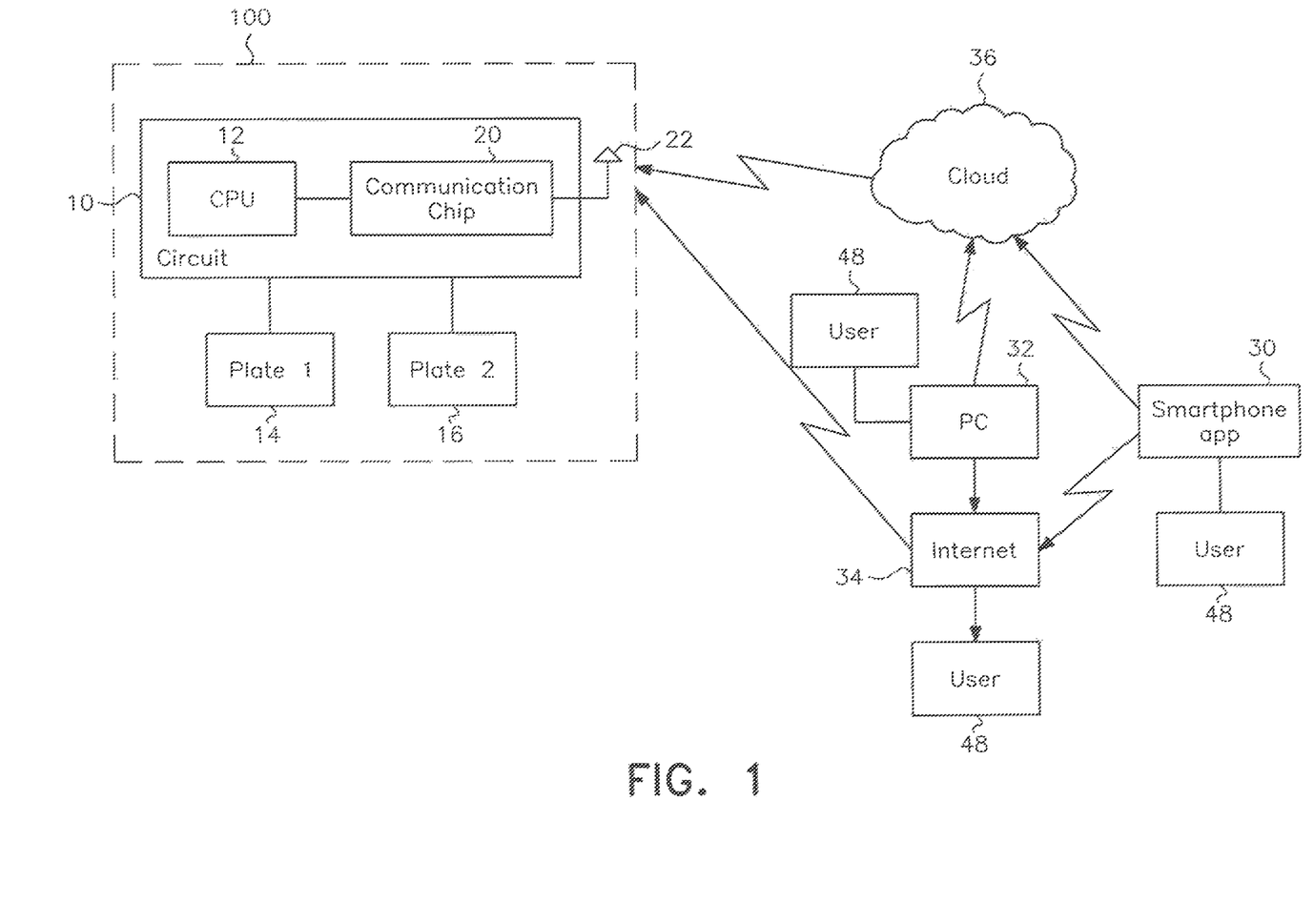
FIG. 1 is a block diagram of an electronic rodent trap configured for remote arming of the trap using a smartphone app or a PC and cloud computing or the internet, in accordance with a first embodiment of the present invention.
Figure 2:
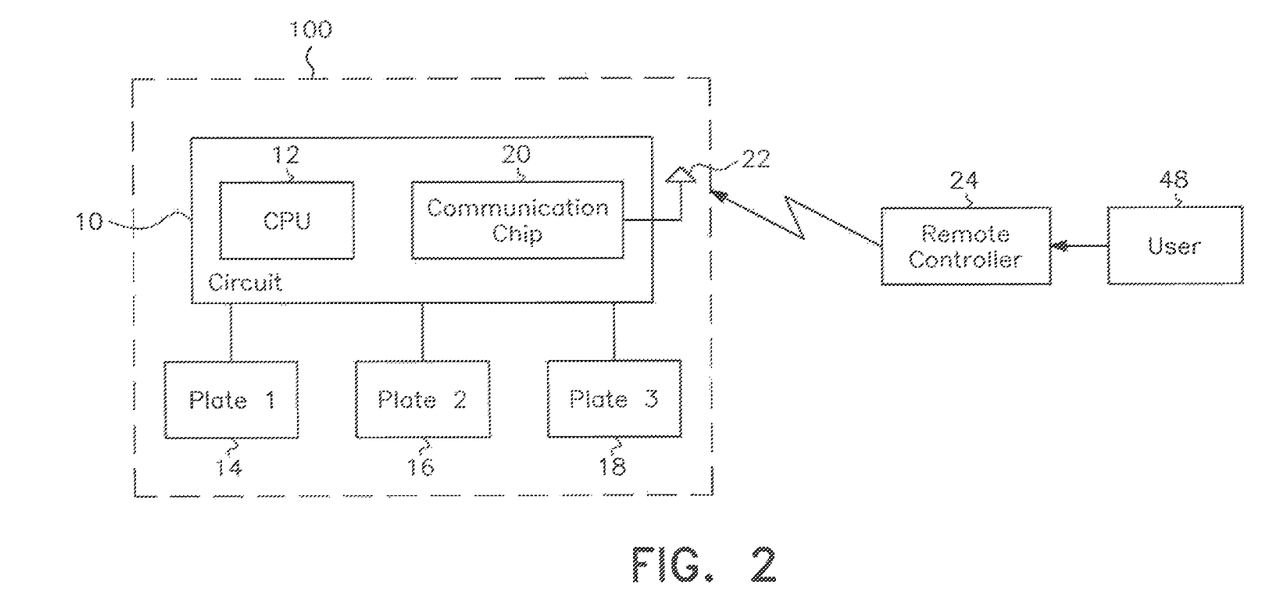
FIG. 2 is a block diagram of an electronic rodent trap configured for remote arming of the trap using a remote controller, in accordance with a second embodiment of the present invention.
Figure 3:
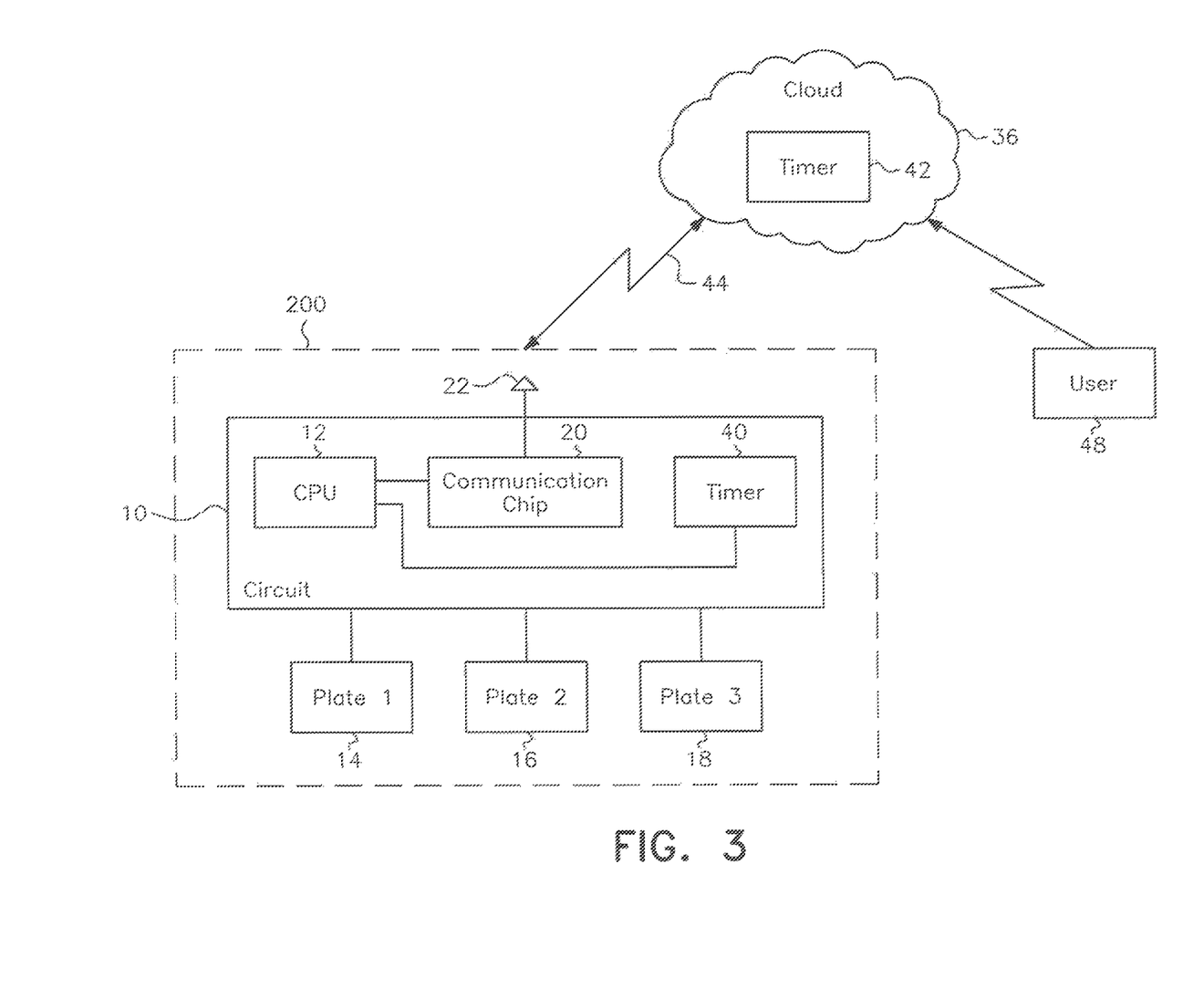
FIG. 3 is a block diagram of an electronic rodent trap operative with a timer for delayed arming of the trap at a specified time or after a specified time delay, in accordance with a third embodiment of the present invention.

As shown in FIG. 1, the present invention is directed to an electronic rodent trap 100 that includes a high voltage output circuit 10 that is controlled by a central processing unit (CPU) 12 and in communication with a first plate 14 and a second plate 16. A third plate 18 may also be included as shown in FIGS. 2 and 3. All of the embodiments may be configured with either two or three plates, or even with additional plates, and the inclusion of two plates versus three plates as between the embodiments shown herein in each of the drawings is meant to be representative without being limiting. Upon activation, the circuit 10 delivers a high voltage pulse train to the plates 14, 16. Electronic rodent traps having high voltage killing plates are described in U.S. Pat. No. 6,735,899 ("the '899 patent"), U.S. Pat. No. 6,836,999 ("the '999 patent") and U.S. Pat. No. 7,219,466 ("the '466 patent"), all of which are commonly owned by the assignee of the instant invention and are hereby incorporated by reference in their entirety as if fully set forth herein.

According to the present invention, the trap 100 includes a communication chip 20 and an antenna 22 that enables the CPU 12, which controls placement of the circuit 10 into a ready or armed state, to be in wireless communication with a remote user 48. The trap 100, unbaited or preferably baited, may be placed in a new trap location in a state in which the trap is not set but is in a waiting or monitoring mode, i.e., is unarmed. In the monitoring mode, the trap is not automatically triggered to deliver a high voltage pulse to the plates 14, 16 in direct response to rodent presence in the trap but may simply wait and then self-arm or be remotely activated upon the occurrence of one or more specified inputs or arming events as will be described hereinafter. The trap may also be configured to perform other functions when in the monitoring mode as will also be outlined herein. Once the trap is armed, the high voltage circuit 10 will be activated by rodent contact with at least two of the plates in like manner to the electronic rodent trap operation described in the '899, '999 and '466 patents previously incorporated by reference herein.

According to the first embodiment shown in FIG. 1, the trap may be set or placed in an armed state by the CPU 12 in response to receipt of a wireless signal from the user 48. The user may send the signal using a smartphone app 30 or any of various kinds of computing devices such as a PC 32 over the internet 34 or using the cloud 36 for transmission to the antenna 22 and communication chip 20, or by any other presently known or future method of wireless network transmission. Accordingly, where the user 48 is represented in the drawings of FIGS. 1-4 without a specific device, it is to be understood that the user may utilize any operating device and/or method configured for initiating or receiving wireless communications.

In a second embodiment shown in FIG. 2, the CPU 12 may place the trap in an armed state in response to a wireless signal sent by the user using a dedicated remote controller 24 that is specifically designed to operate with the trap.

In a third embodiment shown in FIG. 3, the trap 200 is operative with either an internal timer 40 or a cloud-based timer 42. As set by the user 48, the timer defines a time or a wait period during which the trap remains in the monitoring mode. Upon expiration of the time or wait period, the CPU 12 initiates placement of the trap into a set or armed state. The user 48 may choose to override the timer 40, 42 in order the set the trap sooner by sending an arming or activation signal 44 to the trap 200 from the cloud 36 or over the internet as in FIG. 1.

Figure 4:
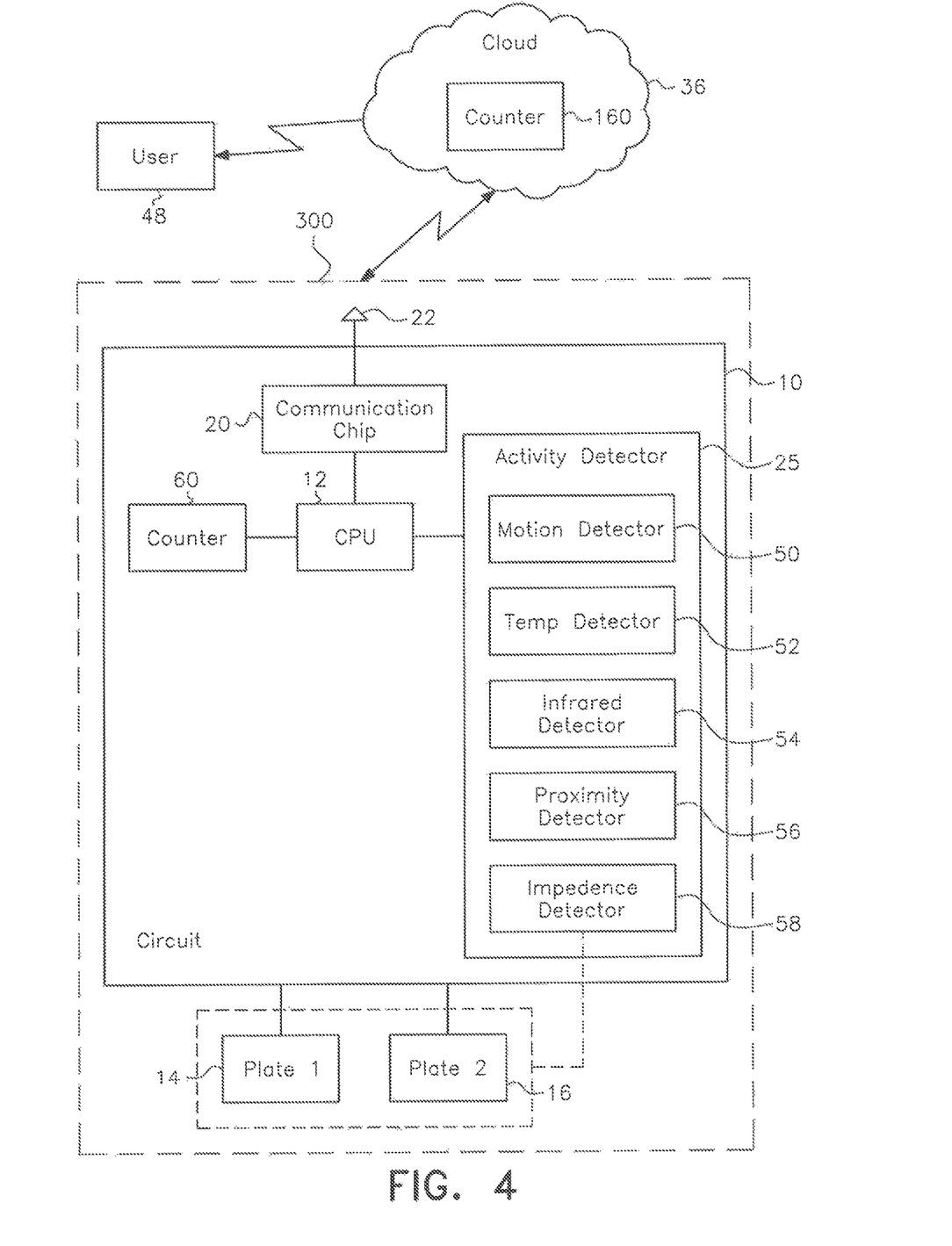
FIG. 4 is a block diagram of an electronic rodent trap having an activity detector that may be embodied as one or more sensors that provide data to the central processing unit which evaluates the data and arms the trap upon detection of activity or a threshold number of interactions with the trap or in response to a remote signal, in accordance with a fourth embodiment of the present invention.

In a fourth embodiment, a trap 300 is provided that includes an activity detector 25. The activity detector 25 may be embodied as one or more sensors for detecting activity proximal to the trap and/or interactions with the trap while the trap is in the monitoring mode. These sensors may include, among others, a motion detector 50, which may be embodied as an accelerometer, a temperature detector 52 responsive to the body temperature of a rodent, an active or passive infrared detector 54, a proximity detector 56 and/or an impedance detector 58 configured to recognize impedance values consistent with a rodent as measured across the plates. Data from the sensors is provided continuously to the CPU 12 where the data is analyzed to determine whether the reported data is consistent with rodent activity or is likely due to some other cause such as insect activity, environmental factors, and the like. While remaining in the monitoring mode, the CPU 12 keeps track of the number and type of interactions using an internal counter 60, a cloud-based counter 160 or the like.

When equipped with an activity detector 25 having one or more sensors, the user can set the trap 300 to arm itself to the kill configuration upon detection of a threshold number of rodent interactions with the trap. The user 48 may also choose to arm the trap 300 independently through transmission of a communication signal via the cloud 36 or using any of the other avenues shown in FIG. 1.

In addition to sensing and tracking activity and/or interactions with the trap as just described, the trap may also be configured to send wireless signals that provide the user 48 with activity alerts. Activity alerts enable the user to be kept apprised of interactions that are occurring at the trap while the trap is in the monitoring mode. In response to these alerts, the user may choose to activate or remotely arm the trap before the threshold number of rodent interactions has occurred through transmission of a wireless signal to the CPU 12 via the communication chip 20.

Figure 5:
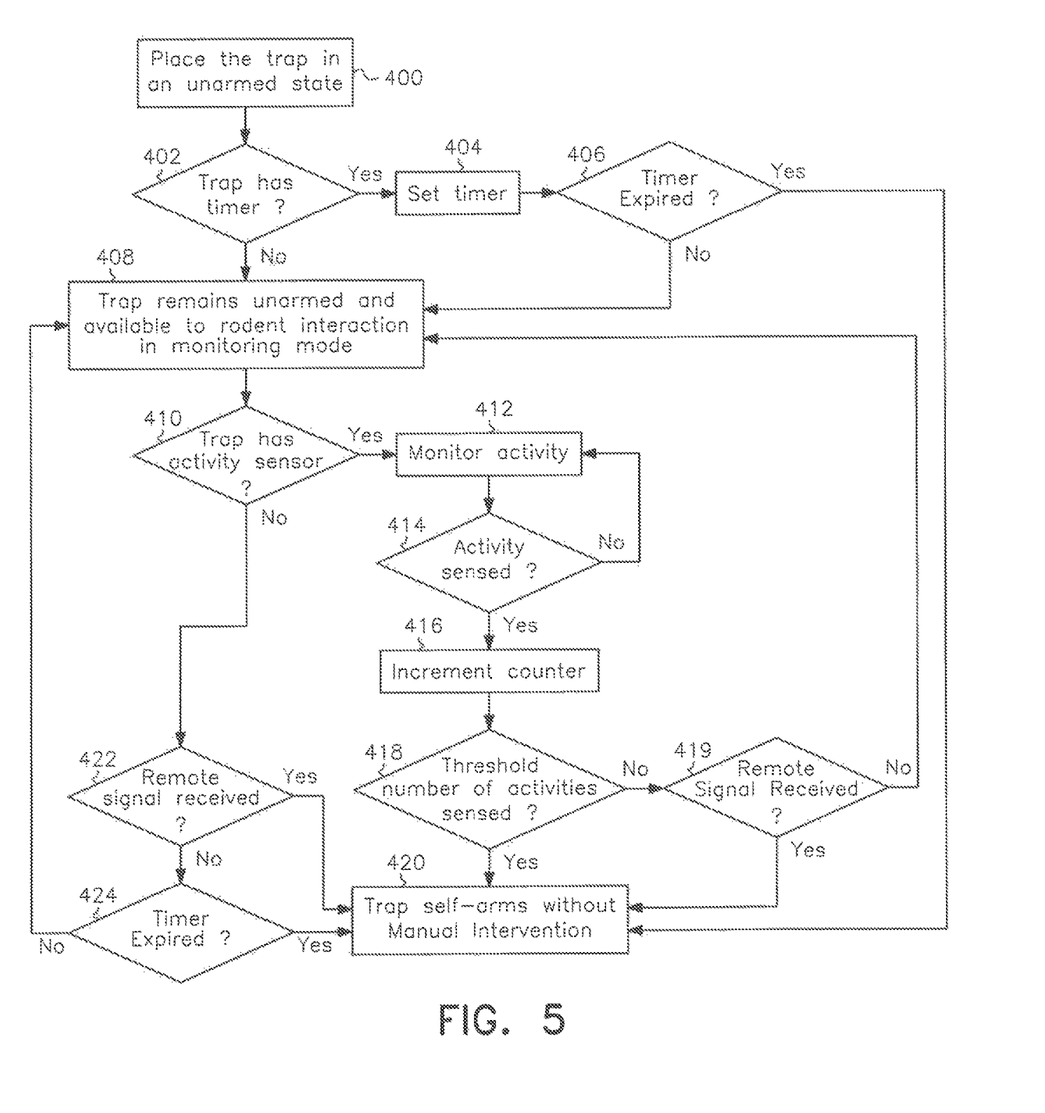
FIG. 5 is a flowchart of the method by which the electronic rodent traps according to the present invention are placed without being set and thereafter, upon expiration of a wait period and/or upon sensing a threshold number of activities proximal to the trap and/or interactions with the trap, or upon receipt of a remotely sent signal, activate themselves without manual intervention.

The present invention is also directed to a method of acclimating rodents to traps by placing the traps in an area of operation without setting them and thereafter, in response to a remote signal, expiration of a time period, sensed activity proximal to the trap, and/or the like, having the traps set or arm themselves without manual intervention as representatively summarized in the flowchart of FIG. 5.

According to the method, the trap is placed in a new location in an unarmed state, step 400. The trap may be baited or unbaited when placed. If the trap has an internal timer, step 402, the timer is set, step 404. The trap thereafter operates in the monitoring mode while keeping track of whether the timer has expired, step 406. If the timer has not expired, step 406, the trap remains unarmed and available to rodent interaction in the monitoring mode, step 408.

If the trap has an activity sensor, step 410, the trap monitors activity proximal to and/or interactions with the trap, step 412. As long as no activity is sensed, step 414, the trap continues to monitor activity, step 412. When activity is sensed, step 414, the trap increments a counter or other like mechanism, step 416, and determines whether a threshold number of activities or interactions has been sensed, step 418. If the threshold number of activities or interactions has not yet been reached, step 418, and in the absence of a remote signal, step 419, the trap remains unarmed and available to rodent interaction in the monitoring mode, step 408. Once the threshold number of activities or interactions has been reached, step 418, or if a remote signal from the user has been received, step 419, the trap self-arms without manual intervention, step 420.

If the trap does not have an activity sensor, step 410, and either does not have a timer, step 402, or has a timer that has not yet expired, step 406, the trap remains unarmed and available to rodent interaction in the monitoring mode, step 408, until a remote signal is received, step 422, or until the timer has expired, step 424. Upon receipt of a remote signal, step 422, whether from a remote controller, or a smartphone app or a PC over the internet or via the cloud, or upon expiration of the timer, step 424, the trap self-arms without manual intervention, step 420.

The present invention may also be configured without a communications chip with the central processing unit of the trap being configured to change a state of the trap from an unarmed state to an armed state in response to an arming event that occurs at a time subsequent to trap deployment and without manual intervention by a user. The arming event may, for example, be the expiration of a time period set by a self-contained timer at the trap. Also, or alternatively, the trap may include an activity sensor and the arming event may be detection of a threshold level of rodent activity in or adjacent to the trap by the activity sensor. The trap could also be equipped with other self-contained sensors operative without input from an outside source to activate the trap at a time subsequent to initial deployment, or at the time of deployment.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A self-arming electronic rodent trap comprising:
   a high voltage output circuit coupled to a plurality of killing plates;
   a central processing unit for controlling the high voltage output circuit, said central processing unit being configured to change a state of the trap from an unarmed state wherein the high voltage output circuit is not automatically activated by a rodent, to an armed state wherein the high voltage output circuit remains inactive until it is activated by a rodent, in response to an arming event that occurs at a time subsequent to trap deployment, said change of state being effected without physical manipulation of the trap by a user and without the trap being previously armed by the user; and
   a timer, said arming event including expiration of a time period set by said timer, said timer being initiated in response to a user input and independent of a rodent interaction with the trap.

2. The self-arming electronic rodent trap as set forth in claim 1, said trap further comprising an activity sensor, said trap in the unarmed state using said activity sensor to monitor activity in or adjacent the trap while the high voltage circuit remains inactive, said arming event including detection of a threshold level of rodent activity in or adjacent the trap by said activity sensor, the central processing unit being further configured to, in response to the initiating of said timer by the user input, monitor activity in or adjacent the trap with the trap in the unarmed state until the first of either the detection of the threshold level of rodent activity or the expiration of the time period results in the arming event.

3. The self-arming electronic rodent trap as set forth in claim 2, wherein said activity sensor includes at least one sensor selected from the group consisting of a motion detector, a temperature detector, an active infrared detector, a passive infrared detector, a proximity detector and an impedance detector.

4. The self-arming electronic rodent trap as set forth in claim 2, wherein said threshold level includes reaching a threshold number of rodent interactions with the trap as detected by the activity sensor, the threshold number being greater than one.

5. The self-arming electronic rodent trap as set forth in claim 1, said trap further comprising a communications chip that enables the central processing unit to be in wireless communication with a remote device, said arming event including receipt of a wireless signal from the remote device instructing the central processing unit to activate the trap to the armed state.

6. A self-arming electronic rodent trap system comprising:
   an electronic rodent trap having a high voltage output circuit coupled to a plurality of killing plates, a central processing unit for controlling the high voltage output circuit, and a communications chip, said central processing unit being configured to change a state of the trap from an unarmed state wherein the high voltage output circuit is not automatically activated by a rodent, to an armed state wherein the high voltage output circuit remains inactive until it is activated by a rodent, in response to an arming event that occurs at a time subsequent to trap deployment, said change of state being effected in an absence of physical manipulation of the trap by a user and without the trap being previously armed by the user, the trap responsive to a timer, said arming event including expiration of a time period set by said timer, said timer being initiated in response to a user input and independent of a rodent interaction with the trap; and
   a remote device enabling the user to wirelessly communicate with the trap central processing unit through the communications chip.

7. The self-arming electronic rodent trap system as set forth in claim 6, wherein the communication by the remote device to the trap central processing unit serves as the arming event to change said state of the trap from said unarmed state to said armed state.

8. The self-arming electronic rodent trap system as set forth in claim 6, wherein the remote device includes at least one of a dedicated remote controller, a smartphone application, a computing device with an internet connection, and a computing device using cloud communication.

9. The self-arming electronic rodent trap system as set forth in claim 6, wherein said timer is internal to the trap or a cloud-based timer.

10. The self-arming electronic rodent trap system as set forth in claim 9, wherein said system is configured to enable the user with said remote device to send an arming instruction before expiration of the time period, said trap changing to the armed state in response to said arming instruction.

11. The self-arming electronic rodent trap system as set forth in claim 6, said trap further comprising an activity sensor, said trap in the unarmed state using said activity sensor to monitor activity in or adjacent the trap while the high voltage output circuit remains inactive, said arming event including detection of a threshold level of rodent activity in or adjacent to the trap by said activity sensor.

12. The self-arming electronic rodent trap system as set forth in claim 11, wherein said system is configured to enable the user with said remote device to receive trap activity updates from the trap and to send an activation instruction to place the trap in the armed state before said threshold level of rodent activity has been detected.

13. The self-arming electronic rodent trap as set forth in claim 11, wherein said activity sensor includes at least one sensor selected from the group consisting of a motion detector, a temperature detector, an active infrared detector, a passive infrared detector, a proximity detector and an impedance detector.

14. A method of operating an electronic rodent trap to enable rodents to become acclimated to the trap, the method comprising the steps of:
   placing an electronic rodent trap in a desired location in an unarmed state, said electronic rodent trap having a high voltage output circuit coupled to a plurality of killing plates, and a central processing unit for controlling the high voltage output circuit;
   setting and starting an internal timer of the trap for a time period, the starting of the internal timer being independent of a rodent interaction with the trap;
   said trap in said unarmed state wherein the high voltage output circuit is not automatically activated by a rodent, and operating in the desired location in a monitoring mode that does not result in activation of the high voltage output circuit upon rodent interaction with the trap;
   said trap remaining in monitoring mode until an arming event occurs, with expiration of said time period causing the arming event;
   said central processing unit, in response to said arming event, changing the trap from said unarmed state to an armed state wherein the high voltage circuit output remains inactive until it is activated by a rodent, said change being effected by said central processing unit without physical manipulation of the trap by a user and without the trap being previously armed by the user.

15. The method as set forth in claim 14, wherein the trap further includes an activity sensor, said step of operating in the desired location in the monitoring mode including said trap monitoring activity adjacent the trap using said activity sensor, said trap remaining in the monitoring mode until a threshold number of interactions have been sensed, sensing of said threshold number of interactions serving as the arming event.

16. The method as set forth in claim 14, wherein said arming event includes the trap receiving a wireless activation signal sent from a remote device instructing the central processing unit to arm the trap.

17. The method as set forth in claim 14, further comprising said user setting a cloud-based timer for a time period, said trap operating in the monitoring mode until the time period expires, expiration of said time period serving as the arming event.

18. The method as set forth in claim 14, wherein said arming event includes the trap receiving a wireless activation signal sent from a remote device selected from the group consisting a dedicated remote controller, a smartphone application, a computing device with an internet connection, and a computing device using cloud communication.

* * * * *